(12) United States Patent
Krummrich

(10) Patent No.: US 7,065,296 B2
(45) Date of Patent: Jun. 20, 2006

(54) METHOD FOR STABILIZATION AND RECONFIGURATION OF A TRANSPARENT PHOTONIC NETWORK

(75) Inventor: Peter Krummrich, Munich (DE)

(73) Assignee: Siemens Aktiengesellschaft, Munich (DE)

(*) Notice: Subject to any disclaimer, the term of this patent is extended or adjusted under 35 U.S.C. 154(b) by 735 days.

(21) Appl. No.: 09/962,519

(22) Filed: Sep. 25, 2001

(65) Prior Publication Data
US 2002/0049851 A1 Apr. 25, 2002

(30) Foreign Application Priority Data
Sep. 25, 2000 (DE) .............................. 100 47 362

(51) Int. Cl.
*H04B 17/00* (2006.01)
(52) U.S. Cl. ...................................................... 398/38
(58) Field of Classification Search .................... 398/1, 398/5, 81, 180, 83, 56, 17, 82, 30, 34, 38; 370/216, 351
See application file for complete search history.

(56) References Cited

U.S. PATENT DOCUMENTS

| | | | | |
|---|---|---|---|---|
| 4,882,774 A | * | 11/1989 | Grotzinger | 398/17 |
| 5,926,590 A | | 7/1999 | Mao | |
| 6,038,044 A | | 3/2000 | Fee et al. | |
| 6,154,296 A | | 11/2000 | Elahmadi et al. | |
| 6,304,347 B1 | * | 10/2001 | Beine et al. | 398/38 |
| 6,449,074 B1 | * | 9/2002 | Okano et al. | 398/91 |
| 6,704,511 B1 | * | 3/2004 | Kerfoot et al. | 398/85 |
| 2002/0048066 A1 | * | 4/2002 | Antoniades et al. | 359/128 |

* cited by examiner

*Primary Examiner*—David C. Payne
(74) *Attorney, Agent, or Firm*—Bell, Boyd & Lloyd LLC

(57) ABSTRACT

A method for stabilization of a transparent photonic network having at least one WDM path which has a specific number of channels on which signals can be transmitted, and a method for reconfiguration of a transparent photonic network from a first WDM path to a second WDM path between two points which have a number of channels on which signals can be transmitted.

10 Claims, 2 Drawing Sheets

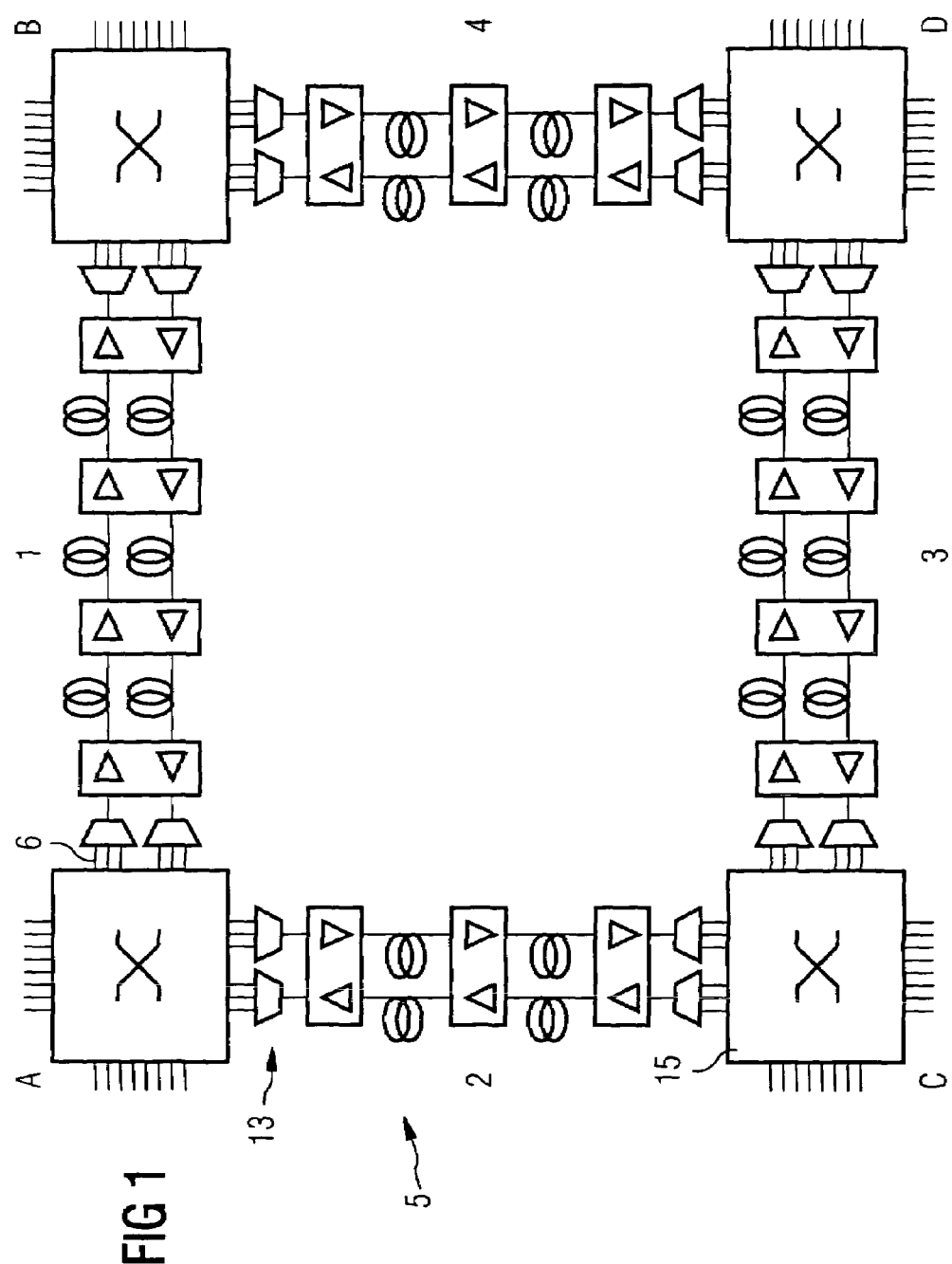

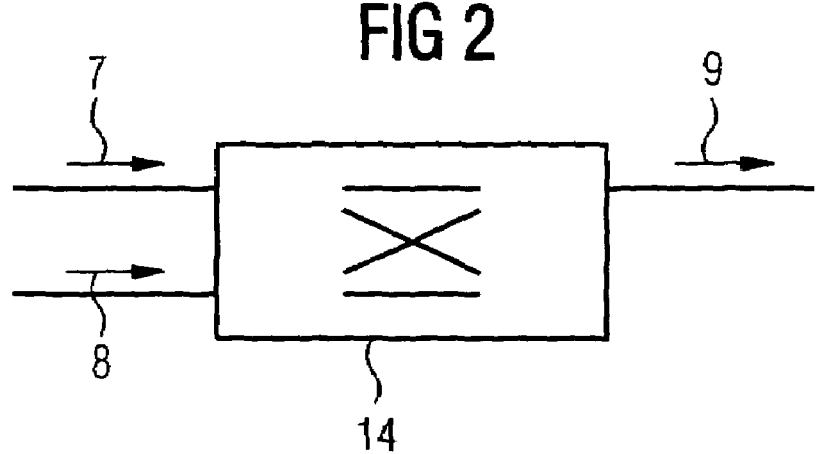
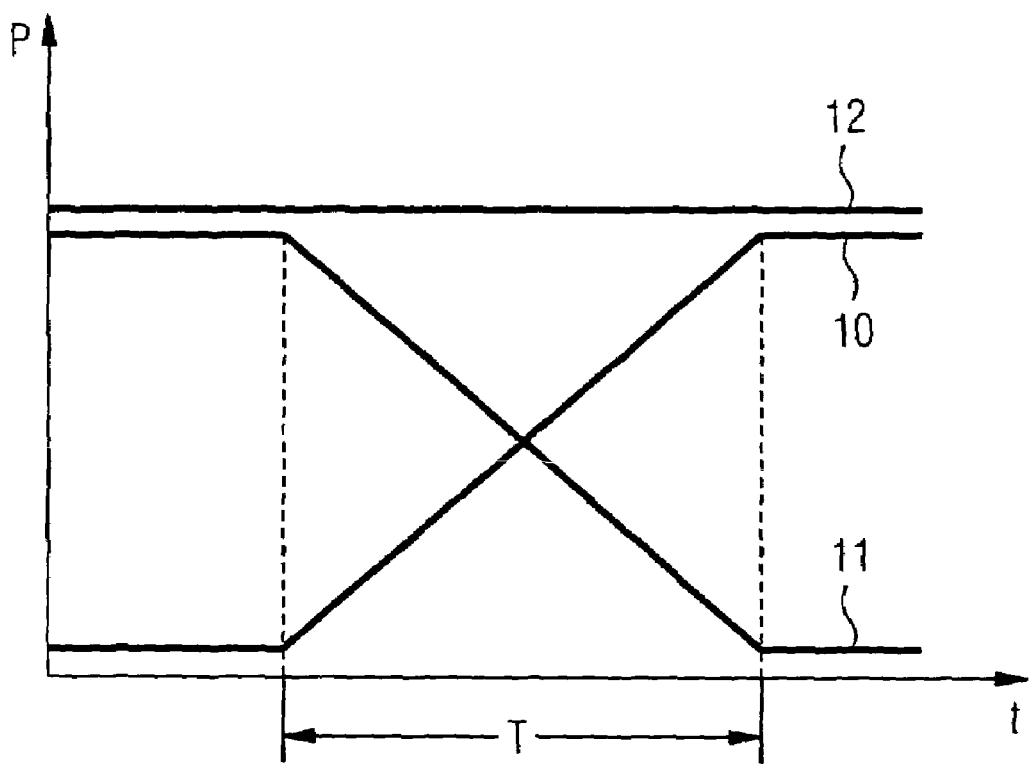

METHOD FOR STABILIZATION AND RECONFIGURATION OF A TRANSPARENT PHOTONIC NETWORK

BACKGROUND OF THE INVENTION

The present invention relates to a method for stabilization of a transparent photonic network having at least one wavelength division multiplexing (WDM) path which has a specific number of channels on which signals can be transmitted, and to a method for reconfiguration of a transparent photonic network from a first WDM path to a second WDM path between two points which have a number of channels on which signals can be transmitted.

The rapid growth in the Internet has resulted in an equivalent increase in the amount of data traffic. The operators use WDM systems in order to allow appropriate transmission capacities to be provided. The systems are generally operated as purely static point-to-point systems, passing the entire data stream from a point A to a point B via the same transmission path over a relatively long time period. However, the operators of optical networks would like to increase the flexibility by being able to dynamically match the optical networks to changes in the amount of traffic. This is achieved by using a transparent network composed of intermeshed WDM paths. At the nodes, there are transparent switching matrices, which allow the data streams to be switched flexibly on the basis of individual wavelengths. This is known as dynamic wavelength routing. The consequence of such a method is that the WDM paths are operated with a continuously changing number of channels. The frequent connection and disconnection of channels regularly leads to a deterioration in the signal quality of the remaining channels owing to nonlinear effects in the optical amplifiers, or in the transmission fiber.

The WDM paths used at the moment operate with such high total levels at the input of the transmission fiber that the optical amplifiers need to be operated in their saturation region. Linear operation of the amplifiers would necessitate a different design with considerably higher pump power levels, which would lead to very inefficient use of the pump power, and to higher costs. Saturation operations occur when the gain for the individual channels depends on the input power and on the number of active channels, without any adaptation of the pump power. Without countermeasures, connection or disconnection of channels results in disturbing level fluctuations in the remaining channels. In order to counteract this effect, the gain of the optical amplifiers is controlled. This gain control, for example, measures the total level both at the input and at the output of the amplifier, and keeps the ratio between the two levels constant by matching the pump power. If the amplifiers have a flat gain spectrum and the gain control operates sufficiently quickly, this can ensure that the gain is constant in the remaining channels. Level fluctuations in the remaining channels, caused by amplifier saturation, when channels are connected and disconnected can be suppressed adequately via such gain control.

However, owing to the major growth in transmission capacity, an immense increase in the number of channels is required, which is leading to ever broader transmission bands and increasing total power levels being used at the input to the transmission fibers. In a system which, for example, is operating in the wavelength band from 1,530 to 1,565 nm (C band) and in a wavelength band from 1,570 to 1,605 nm (L band), 160 channels are transmitted in each band, with a data rate of 10 Gbps per channel. The total power levels at the fiber input are in this case greater than 23 dBm. Such widely used wavelength bands and high input power levels result in the channel level distribution in the transmission fiber being distorted by stimulated Raman scatter (SRS). The extent of distortion in this case depends on the input power level, and hence on the number of active channels. When channels are connected and disconnected, the distortion varies with time constants on the order of milliseconds or less. The remaining channels are thus subject to rapid level fluctuations in each path section. When gain control is used for the optical amplifiers, level fluctuations in each path section are additive, resulting in large level fluctuations on the order of several dB at the end of the path. Unless countermeasures are taken, these fluctuations can lead to transmission faults, to failure of individual channels, or even to failure of the entire path.

The distortion of the channel level distribution in the transmission fiber resulting from SRS can be compensated for statically via variable attenuators or filters in the intermediate amplifiers. However, when channels are connected or disconnected, the compensation mechanism must be readjusted in an appropriate manner. Complete avoidance of level fluctuations produced by SRS with the short time constants referred to is impossible to achieve, or can be achieved only with an extremely high level of complexity.

An object of the present invention is, therefore, to provide a method for stabilization and reconfiguration of a transparent photonic network, whereby level fluctuations can be avoided, despite short time constants.

SUMMARY OF THE INVENTION

Accordingly, for stabilization of a transparent photonic network, the present invention provides for both the number of channels which are allocated to a signal and the channel power levels of the individual signals at the input of a WDM path to be kept constant. As such, no level fluctuations caused by saturation of the optical amplifiers or SRS in the transmission fiber occur in any of the channels. When a transparent photonic network is reconfigured, according to the present invention, from a first WDM path to a second WDM path, the channel allocation described for stabilization according to the present invention is kept constant overall for the second WDM path, to which the reconfiguration is carried out. This ensures that the second WDM path is not subject to any channel level fluctuations either before or after the reconfiguration.

It is advantageous for one channel to be allocated to a filling signal for bridging when no new data signal is yet available when the old data signal is switched off. Thus, the level of this channel is kept constant even if the old data signal is not immediately replaced by a new data signal, thereby providing for more flexible handling.

Optical add and drop multiplexers are advantageously used for outputting and insertion of individual channels along the WDM path. Thus, with the capability to connect or disconnect channels during the reconfiguration process, the present invention provides even more flexibility.

Preferably, all the channels on which signals can be transmitted are started up when the WDM path is first switched on, with those channels which are not required each being allocated to a filling signal. This ensures that further channels may be allocated to a data signal later without leading to any level fluctuation in the channel under question or in the other channels. This leads to further stabilization of the WDM network.

Preferably, in one embodiment of the present invention, when the transmission capacity rises, the required number of channels with filling signals are replaced by channels with data signals. Thus, the number of channels in use may be increased in steps. It is likewise possible for the data signal to be replaced by a filling signal in channels which have been used up to a given point in time, but are no longer required.

Preferably, the channel power level, the sum of the power level of the filling signal and of the power level of the data signal, is kept constant at the input of the WDM path. Thus, it becomes simpler to carry out a transition from a channel which is allocated to a filling signal and is not in use to a channel allocated to a data signal and in use. Since only a fluctuation in the total power on a channel can produce a channel level fluctuation, and hence transmission faults, this is reliably avoided by the described overlaying process.

Since the distortion of the channel level distribution resulting from SRS takes place in the order of milliseconds, the channel level distribution is not distorted even if the total level is not kept entirely constant during the reduction and increase.

Additional features and advantages of the present invention are described in, and will be apparent from, the following Detailed Description of the Invention and the Figures.

BRIEF DESCRIPTION OF THE FIGURES

FIG. 1 shows a block diagram of a transparent photonic network.

FIG. 2 shows a coupler for mixing a data signal and a filling signal.

FIG. 3 shows a time profile of the power levels at the output of the coupler.

DETAILED DESCRIPTION OF THE INVENTION

FIG. 1 shows a transparent photonic network 5. The network 5 has four WDM paths 1, 2, 3, 4, which are each connected at their end points A, B, C, D to a transparent optical switching matrix 15. If a data signal is to be transmitted from the end point A to the end point B, it can be transmitted either as a channel at a given wavelength via a first WDM path 1 or as a channel at the same wavelength via a second WDM path, which comprises three path sections 2, 3, 4 via the switching matrices 15 associated with the end points C and D. The individual WDM paths 1, 2, 3, 4 are formed in the normal way. They have multiplexers and demultiplexers, boosters, a number of transmission path sections, intermediate amplifiers and preamplifiers. These will not be described in further detail, since they are not critical to the present invention.

When the first WDM path 1 is first switched on, all the channels 6 which the system can transmit in its final extent are started up. This also applies to all the channels 6 for the second WDM path 2, 3, 4. If the initially desired transmission capacity is less than that which can be achieved with the final extent, filling signals 8 are used for those channels 6 which are not required for data transmission. When the transmission capacity rises, the filling channels 8 are replaced in steps by data channels 7. This is illustrated in FIGS. 2 and 3.

The power level 12 in each of the channels 6 is kept constant for each of these individual channels 6 via a special coupler 14. The coupler 14 has two inputs, with one being available to the data signal 7 and the other to the filling signal 8. A signal 9 to be transmitted is emitted at an output from the coupler 14. The level of the signal 9 corresponds to the channel power level 12, which is composed of the two power levels 10, 11 of the data signal 7 and of the filling signal 8. The power level 11 of the filling signal 8 is thus reduced, and the power level 10 of the data signal 7 is thus raised, such that the sum of the two power levels 10, 11 at the input 13 to the WDM path 1 remains constant. Due to the transmission with a constant total power level, all the channel power levels 12 for the WDM path 1 remain constant, and no channel level fluctuations are caused by saturation of the optical amplifiers or SRS in the transmission fiber. This applies equally to the second WDM path 2, 3, 4.

FIG. 3 shows the time profiles of the power levels 10, 11, 12 at the output of the coupler 14. The power level 10 of the data signal 7 at the output to the first WDM path 1 is reduced completely within a time interval T of, for example, one millisecond, while the power level 11 of the filling signal 8 is raised during this time interval T. Overall, the two signals 7, 8 at the input 13 of the WDM path 1 form a signal 9 with a constant channel power level 12. This also applies throughout the time interval T in which the changeover is made from the filling signal 8 to the data signal 7.

During undisturbed operation, a data signal 7 is passed to a specific channel 6 with a predetermined wavelength. If the first WDM path 1 fails, then a rapid switch is made to the second WDM path via the path sections 2, 3, 4. If the corresponding wavelength of the channel 6 on the second WDM path 2, 3, 4 was occupied by another data signal 7, this is first disconnected. The changeover from the old data signal 7 to the new data signal 7 takes place in such a way that the channel power level 12 at the input of the path section 2 remains constant. If the corresponding wavelength was not in use for transmission of a data signal 7, the changeover from the filling signal 8 to the new data signal 7 is made with a constant channel power level 12. Thus, the channel power levels on the path sections 2, 3, 4 do not vary at any time. This prevents channel level fluctuations in those channels 6 which are not being switched.

During the reconfiguration of the WDM path, individual channels 6 must be connected or disconnected. This is done essentially using the same principle as when changing from a filling signal 8 to a data signal 7. The channel power level 12 of the channel to be disconnected is thus reduced via the coupler 14, while the channel power level 12 of the new channel 6 is raised, such that the total of the two power levels at the input 13 of the second WDM path 2, 3, 4 remains constant. If no new data signal 7 is yet available for the respective channel wavelength when the old data signal 7 is switched off, a filling signal 8 is used for bridging.

Since the channel levels 12 are always kept constant, there is no restriction on the number of data signals 7 which need to be in operation. Except for a single data signal 7, all the other data signals can be disconnected at the same time, and the simultaneous connection of a correspondingly large number of new data signals 7 does not lead to any level fluctuations in the remaining data signal 7.

Although the present invention has been described with reference to specific embodiments, those of skill in the art will recognize that changes may be made thereto without departing from the spirit and scope of the invention as set forth in the hereafter appended claims.

The invention claimed is:

1. A method for stabilizing a transparent photonic network having at least one WDM path which has a specific number of channels on which signals are transmitted, the transparent photonic network being subject to level fluctuations caused by connection and disconnection of channels, the method comprising:

switching signals of the transparent photonic network based on individual wavelengths;

maintaining constant a number of the channels allocated to a particular signal of the signals switched; and maintaining constant a channel power level corresponding to the particular signal at an input of the at least one WDM path, wherein maintaining constant the number of channels and the channel power level substantially stabilizes the level fluctuations caused by the connection and disconnection of the channels in the transparent photonic network.

2. A method for stabilizing a transparent photonic network as claimed in claim 1, further comprising controlling a gain of at least one optical amplifier of the transparent photonic network to reduce the level fluctuations.

3. A method for stabilizing a transparent photonic network as claimed in claim 1, further comprising allocating a filling signal to a particular channel to bridge data when no new data is available.

4. A method for stabilizing a transparent photonic network as claimed in claim 3, wherein the filling signal is allocated upon start up to selected channels not required for transmitting signals.

5. A method for stabilizing a transparent photonic network as claimed in claim 3, further comprising reducing a power level corresponding to the filling signal and increasing a power level corresponding to the new data on the same particular channel to maintain constant the channel power level.

6. An apparatus for stabilizing a transparent photonic network subject to level fluctuations caused by connection and disconnection of channels, the apparatus comprising:

at least one WDM path having a specific number of channels on which signals are transmitted; and a transparent optical switching matrix for switching the signals of the transparent photonic network based on individual wavelengths;

wherein the transparent optical switching matrix maintains constant a number of the channels allocated to a particular signal of the signals switched, and wherein the transparent optical switching matrix maintains constant a channel power level corresponding to the particular signal at an input of the at least one WDM path such that the level fluctuations caused by the connection and disconnection of the channels in the transparent photonic network are substantially stabilized.

7. An apparatus for stabilizing a transparent photonic network as claimed in claim 6, further comprising a coupler for maintaining constant the channel power level of a particular channel.

8. An apparatus for stabilizing a transparent photonic network as claimed in claim 7, wherein the coupler couples a filling signal to the particular channel when the particular channel is not transmitting data.

9. An apparatus for stabilizing a transparent photonic network as claimed in claim 8, wherein the coupler decreases a power level corresponding to a filling signal and increases a power level corresponding to the data to maintain constant the channel power level of the particular channel.

10. An apparatus for stabilizing a transparent photonic network as claimed in claim 6, further comprising an optical amplifier division multiplexer for at least one of outputting and inserting individual channels.

* * * * *